United States Patent
Lim et al.

(10) Patent No.: US 7,532,491 B2
(45) Date of Patent: May 12, 2009

(54) APPARATUS AND METHOD FOR SUPPLYING DC POWER SOURCE

(75) Inventors: Sun-Kyoung Lim, Seoul (KR); Dai-Hyun Kim, Gwangmyeong (KR); Hag-Wone Kim, Cheonan (KR)

(73) Assignee: LG Electronics Inc., Seoul (KR)

( * ) Notice: Subject to any disclaimer, the term of this patent is extended or adjusted under 35 U.S.C. 154(b) by 175 days.

(21) Appl. No.: 11/470,321

(22) Filed: Sep. 6, 2006

(65) Prior Publication Data

US 2007/0217236 A1 Sep. 20, 2007

(30) Foreign Application Priority Data

Mar. 14, 2006 (KR) ...................... 10-2006-0023713

(51) Int. Cl.
*H02M 5/40* (2006.01)
(52) U.S. Cl. .......................................... 363/34; 363/89
(58) Field of Classification Search .................... 363/34, 363/37, 84, 89, 125
See application file for complete search history.

(56) References Cited

U.S. PATENT DOCUMENTS

| | | | | |
|---|---|---|---|---|
| 5,373,223 | A | * 12/1994 | Akagi et al. ................. | 318/722 |
| 5,831,842 | A | * 11/1998 | Ogasawara et al. ........... | 363/40 |
| 5,956,243 | A |   9/1999 | Mao | |
| 6,137,700 | A | 10/2000 | Iida et al. | |
| 6,181,583 | B1 | 1/2001 | Okui et al. | |
| 6,204,627 | B1 * | 3/2001 | Watanabe et al. ........... | 318/729 |
| 6,310,787 | B2 * | 10/2001 | Ito et al. ........................ | 363/34 |
| 6,335,870 | B1 * | 1/2002 | Sakurai ........................ | 363/34 |
| 6,906,933 | B2 * | 6/2005 | Taimela ........................ | 363/37 |

FOREIGN PATENT DOCUMENTS

| | | |
|---|---|---|
| EP | 1022844 | 7/2000 |
| EP | 1298782 | 4/2003 |
| JP | 5-068376 | 3/1993 |

OTHER PUBLICATIONS

English Language Abstract of JP 5-068376. Mar. 19, 1993.
U.S. Appl. No. 11/532,550 to Lim et al., which was filed on Sep. 18, 2006.

* cited by examiner

*Primary Examiner*—Adolf Berhane
(74) *Attorney, Agent, or Firm*—Greenblum & Bernstein, P.L.C.

(57) ABSTRACT

An apparatus and method for supplying a direct current power source capable of compensating a power factor of an input power source by increasing and decreasing energy required by load changes, the apparatus comprising: an input current detecting unit for detecting an input current amount to determine a load size, a switching control unit for outputting a switching control signal to compensate a power factor of an input power source based upon the determined load size, a filtering/rectifying unit for reducing a harmonic of the input current and rectifying an input AC voltage, a power factor compensating unit for supplying charged energy to the load based upon the switching control signal, a smoothing unit for smoothing the rectified input AC voltage into a DC voltage, and an inverter for converting the smoothed DC voltage into an AC voltage and outputting the converted AC voltage to drive the load, whereby the power factor compensation (PFC) standard can be satisfied although the load is increased, and a fabricating cost can be reduced by using a reactor with a low capacity.

21 Claims, 7 Drawing Sheets

APPARATUS AND METHOD FOR SUPPLYING DC POWER SOURCE

RELATED APPLICATION

The present disclosure relates to subject matter contained in priority Korean Application No. 10-2006-0023713, filed on Mar. 14, 2006, which is herein expressly incorporated by reference in its entirety.

BACKGROUND OF THE INVENTION

1. Field of the Invention

The present invention relates to an apparatus and method for supplying a power source, and particularly, to an apparatus and method for supplying a DC power source for driving a compressor of an air conditioner.

2. Background of the Invention

Air conditioners are currently using a three-phase motor as a driving motor of a compressor. A power source supply apparatus of the three-phase motor converts Alternating Current (AC) of a commercial power source into Direct Current (DC), and thereafter re-converts the converted DC into the AC using an inverter. The re-converted AC is then applied to the three-phase motor to drive it.

An apparatus for supplying a DC power source according to the related art will now be explained with reference to FIGS. 1 and 2 hereafter.

FIG. 1 is a view showing an apparatus for supplying a DC power source according to the related art.

As shown in FIG. 1, an apparatus for supplying a DC power source according to the related art includes a converter 110 provided with an active filter 111 and a smooth capacitor C to thus convert an AC voltage inputted from a commercial power source into a DC voltage, and an active filter controlling unit 120 for controlling the active filter 111.

The converter 110 outputs the converted DC voltage to an inverter 130. The inverter 130 converts the DC voltage from the converter 110 into an AC voltage to supply it to a three-phase motor 140 for driving a compressor.

The active filter controlling unit 120 includes a synchronous signal generator 121 for generating a synchronous signal by detecting a zero voltage of the DC voltage inputted from the commercial power source, and an on/off controller 122 for generating control signals, which are used to drive power semiconductor devices Q1 and Q2 of the active filter 111, by being synchronized with the synchronous signal generated from the synchronous signal generator 121.

The active filter 111 is composed of a reactor L and the power semiconductor devices Q1 and Q2, and accordingly forms a waveform phase of an input current to be approximately similar to a waveform phase of an input AC voltage (i.e. to be a sine wave). Hence, the active filter 111 controls the input current to allow a performing of a harmonic removal and a Power Factor Compensation (PFC).

The smooth capacitor C smoothes out an output voltage of the active filter 111 into a DC voltage, and supplies the smoothed DC voltage to the inverter 130.

FIGS. 2(a) and 2(b) are waveform views of an input current of an apparatus for supplying the DC power source according to the related art.

As shown in FIG. 2(a), in an apparatus for supplying the DC power source according to the related art, the power semiconductor devices Q1 and Q2 are alternatively driven once for a certain time within a half period, and accordingly the input current waveform toward the smooth capacitor C based upon the AC voltage of the commercial power source has a great peak value of a current and a narrow conducting width.

As shown in FIG. 2(b), for using a small reactor in the apparatus for supplying the DC power source according to the related art, since an input current amount according to load changes is not sufficient, the waveform of the input current is more greatly fluctuated as compared to the waveform of FIG. 2(a) according to the related art in which the small reactor is not used.

However, the apparatus for supplying the DC power source according to the related art drove the active filter 300 without considering the load changes, in case of a high load, it was difficult to satisfy the PFC spec.

Furthermore, in case of a low load, the apparatus for supplying the DC power source according to the related art occurred energy loss at the power semiconductor device due to the PFC operation.

In addition, the apparatus for supplying the DC power source according to the related art increased a fabricating cost due to using the reactor L with a great capacity for the harmonic removal and the PFC.

SUMMARY OF THE INVENTION

Therefore, an object of the present invention is to provide an apparatus and method for supplying a direct power source supply which is capable of compensating a power factor of an input power source by detecting an input current amount according to load changes to determine a load size, controlling the power factor based upon the determined load size, and varying a current amount supplied to the load, and which is also capable of decreasing a fabricating cost by using a reactor with a low capacity.

To achieve these and other advantages and in accordance with the purpose of the present invention, as embodied and broadly described herein, there is provided an apparatus for supplying a direct current (DC) power source comprising: an input current detecting unit for detecting an input current amount to determine a load size; a switching control unit for outputting a switching control signal to compensate a power factor of an input power source based upon the determined load size; a filtering/rectifying unit for reducing a harmonic of the input current and rectifying an input AC voltage; a power factor compensating unit for supplying charged energy to the load based upon the switching control signal; a smoothing unit for smoothing the rectified input AC voltage into a DC voltage; and an inverter for converting the smoothed DC voltage into an AC voltage and outputting the converted AC voltage to drive the load.

To achieve these and other advantages and in accordance with the purpose of the present invention, a method for supplying a direct current (DC) power source comprises: detecting an input current amount to determine a load size; outputting a switching control signal to compensate a power factor of an input power source; reducing a harmonic of the input current and rectifying an input AC voltage; supplying charged energy to the load based upon the switching control signal; smoothing the rectified input AC voltage into a DC voltage; and converting the smoothed DC voltage into an AC voltage to drive the load.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Preferred embodiments of an apparatus and method for supplying a DC power source according to the present invention will now be explained in detail with reference to FIGS. 3 through 5 hereafter.

Figure 3:
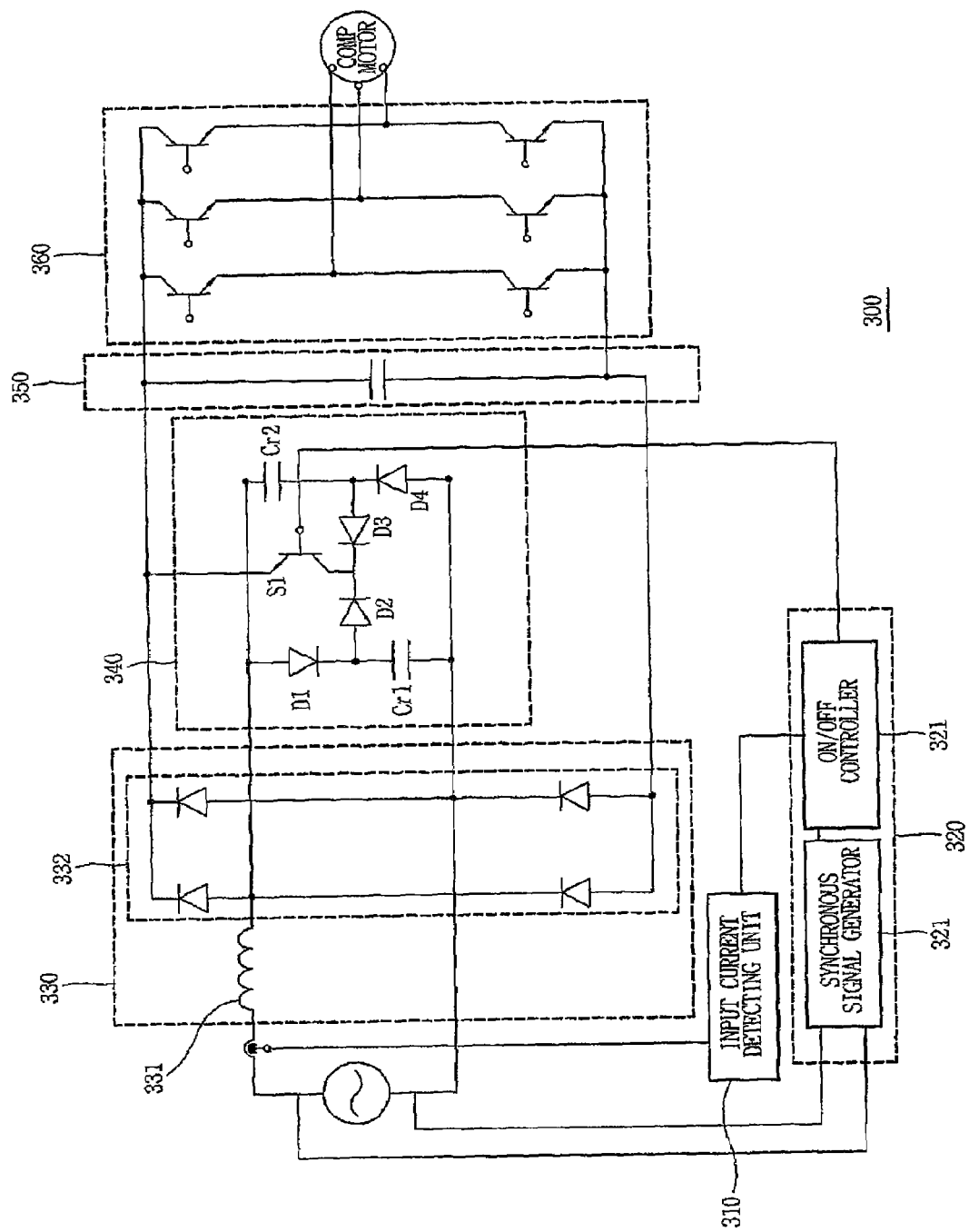
FIG. 3 is a circuit view showing an embodiment of an apparatus for supplying a DC power source according to the present invention.

As shown in FIG. 3, an apparatus 300 for supplying a DC power source comprises an input current detecting unit 310 for detecting an input current amount to determine and output a load size, a switching control unit 320 for outputting a switching control signal to compensate a power factor of an input power source based upon the determined load size, a filtering/rectifying unit 330 for reducing a harmonic of the input current and rectifying an input alternating current (AC) voltage, a power factor compensating unit 340 for supplying charged energy based upon the switching control signal, a smoothing unit 350 for smoothing the rectified input AC voltage into a DC voltage, and an inverter 360 for converting the smoothed DC voltage into an AC voltage and outputting the converted AC voltage to drive the load.

The input current detecting unit 310 further includes a memory for storing a data table obtained by an experiment, the data table showing a relation between an input current amount and a load size corresponding thereto. The input current detecting unit 310 determines the load size based upon the input current amount detected by using the data table.

Also, the input current detecting unit 310 may detect a DC-link current to determine the load size.

The switching control unit 320 includes a synchronous signal generator 321 for detecting a zero-crossing time point of an input power source and generating a synchronous signal based upon the detected zero-crossing time point, and an on/off controller 322 for outputting the switching control signal to control a switch S1 based upon the determined load size.

Here, the switching control signal is synchronized with the synchronous signal.

The synchronous signal generator 321 detects a zero-crossing time point (i.e., a time point when the input power source becomes a zero voltage). The synchronous signal generator 321 generates the synchronous signal based upon the detected zero-crossing time point to output it to the on/off controller 322. Here, the synchronous signal is synchronized at a starting time point of a plus (+) half period or minus (−) half period of the input power source.

The on/off controller 322 varies a turn-on time of the switch S1 and a turn-on delay time Td thereof based upon the load size. An increase in the load size increases the turn-on time Ton of the switch S1.

In addition, the on/off controller 322 determines a Pulse Width Modulation (PWM) ratio of the switching control signal in proportion to the load size.

The filtering/rectifying unit 330 includes a small reactor 331 for reducing a harmonic of the input current and preventing an influx of an inrush current, and a diode bridge circuit 332 for rectifying an input AC voltage.

That is, the small reactor 331 reduces the harmonic of the input current, prevents the influx of the inrush current, and forms a waveform of the input current to be similar to a waveform of the input AC voltage. The diode bridge circuit 332 fully rectifies an AC voltage supplied from a commercial power source.

The power factor compensating unit 340 includes first and second capacitors Cr1 and Cr2 for charging and discharging energy, first through fourth diodes D1, D2, D3 and D4 for forming a path for charging/discharging energy, and the switch S1 for forming the path for supplying the energy to the load.

Also, the power factor compensating unit 340 alternately charges and discharges energy based upon the switching control signal to thus compensate the power factor of the input power source.

In more detail, in the power factor compensating unit 340, upon turning on the switch S1, the first and second diodes D1 and D2 are turned on and the third and fourth diodes D3 and D4 are turned off at a starting time point of a plus (+) half period of the input power source, and accordingly the first capacitor Cr1 charges energy and the second capacitor Cr2 discharges energy, whereas the first and second diodes D1 and D2 are turned off and the third and fourth diodes D3 and D4 are turned on at a starting time point of a minus (−) half period of the input power source, and accordingly the first capacitor Cr1 discharges energy and the second capacitor Cr2 charges energy.

Here, each of the capacitors Cr1 and Cr2 included in the power factor compensating unit 340 may be constituted to have an appropriate capacity through an experiment. If the capacitors Cr1 and Cr2 have capacities greater than the appropriate capacity, the waveform of the input current is more greatly fluctuated, while if they have capacities smaller than the appropriate capacity, the waveform of the input current may not be improved.

Figure 4:
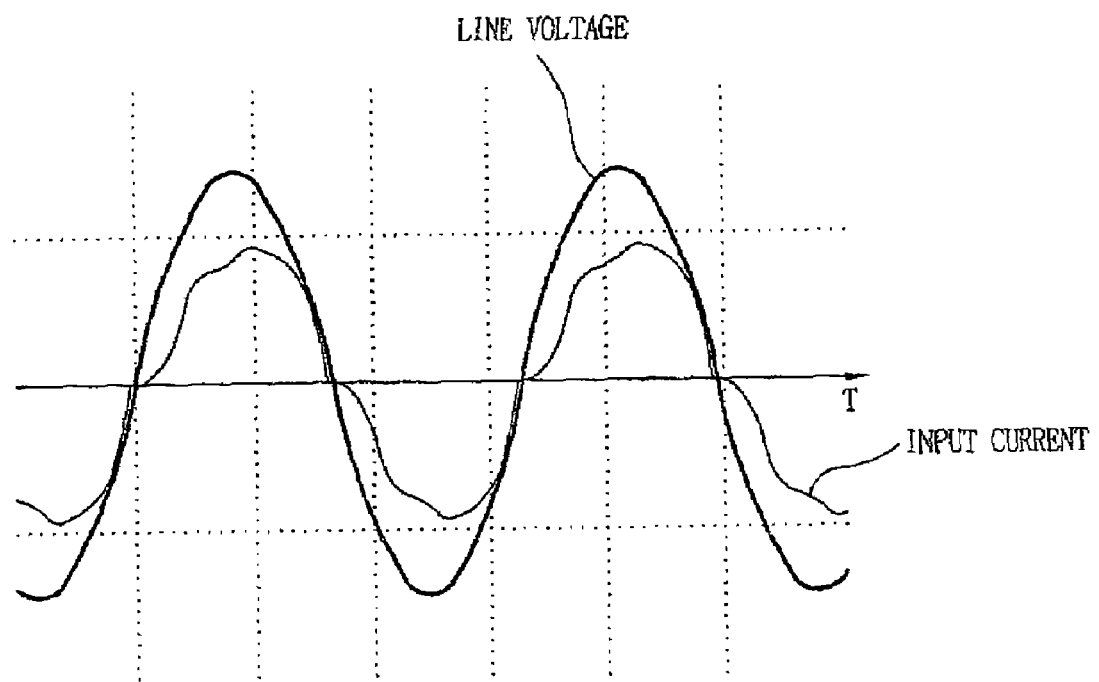
FIG. 4 is a view showing a current waveform when controlling a power factor in accordance with an embodiment of the present invention.

FIG. 4 is a view showing that a waveform of an input current is formed to be similar to a waveform of a line voltage for compensating a power factor according to the present invention even if a load is fluctuated, resulting in an improvement of the waveform of the input current as compared to the waveform of a current according to the related art.

Figure 5:
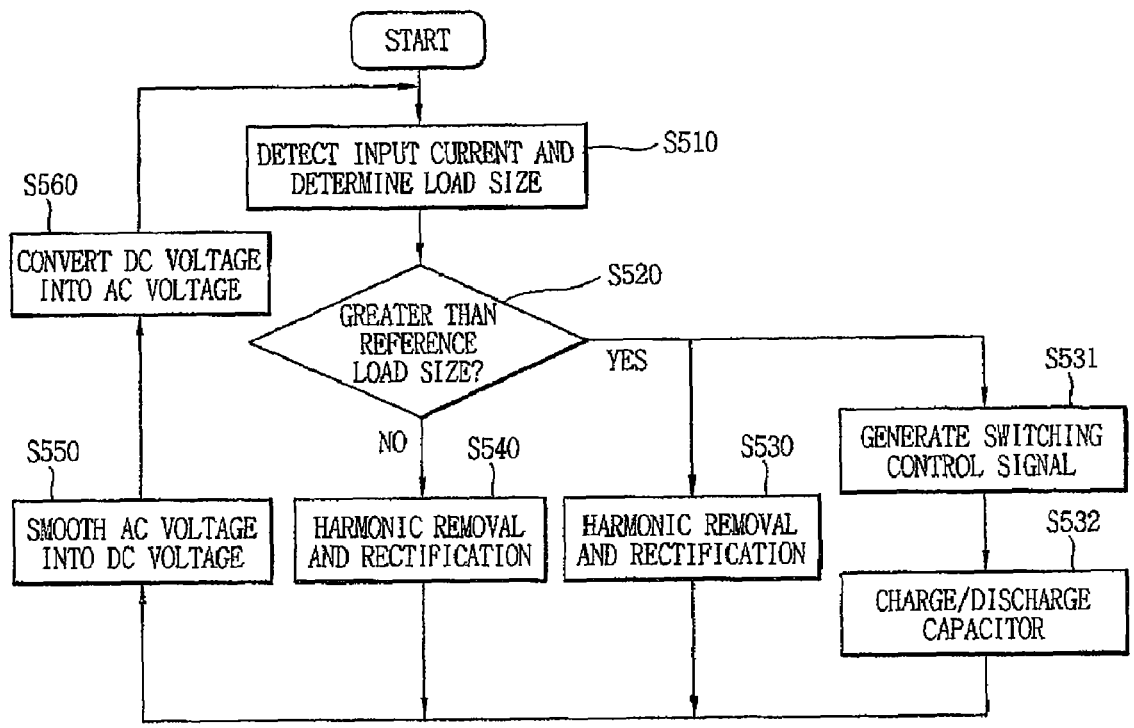
FIG. 5 is a flowchart showing an embodiment of a method for supplying a DC power source according to the present invention.

As shown in FIG. 5, a method for supplying a DC power source according to the present invention comprises detecting an input current amount to determine and output a load size (S510), outputting a switching control signal to compensate a power factor of an input power source based upon the determined load size (S531), reducing a harmonic of the input current and rectifying an input AC voltage (S530 and S540), supplying charged energy to the load based upon the switching control signal (S532), smoothing the rectified input AC voltage into a DC voltage (S550), and converting the smoothed DC voltage into an AC voltage to drive the load (S560).

The determining and outputting of the load size (S520) includes using a data table storing a load size corresponding to the input current amount.

In addition, the determining and outputting of the load size (S520) includes determining the load size by detecting a DC-link current.

The outputting of the switching control signal includes detecting a zero-crossing time point of the input power source to generate a synchronous signal according to the detected zero-crossing time point, and outputting the switching control signal for a power factor compensation based upon the determined load size.

Here, the switching control signal is generated by being synchronized with the synchronous signal.

The outputting of the switching control signal (S531) includes varying a turn-on time Ton and a turn-on delay time Td of the switch S1 based upon the load size.

Furthermore, the outputting of the switching control signal (S531) includes determining a Pulse Width Modulation (PWM) ratio of the switching control signal in proportion to the load size.

The reducing of the harmonic of the input current, and rectifying of the input AC voltage (S530 and S540) includes reducing the harmonic of the input current and preventing an influx of an inrush current, and rectifying an input AC voltage.

In supplying the energy to the load (S532), the power factor of the input power source is compensated by alternately charging and discharging energy according to the switching control signal.

In more detail, in supplying the energy to the load (S532), upon turning on the switch S1, the first and second diodes D1 and D2 are turned on and the third and fourth diodes D3 and D4 are turned off at a starting time point of a plus (+) half period of the input power source, and accordingly the first capacitor Cr1 charges energy and the second capacitor Cr2 discharges energy, whereas the first and second diodes D1 and D2 are turned off and the third and fourth diodes D3 and D4 are turned on at a starting time point of a minus (−) half period of the input power source, and accordingly the first capacitor Cr1 discharges energy and the second capacitor Cr2 charges energy.

That is, in supplying the energy to the load (S532), the input AC voltage is boosted and the power factor is compensated by alternately charging energy in the capacitor and discharging the energy to the load in correspondence to the half-period of the input power source based upon the switching control signal, and a waveform of the input current is simultaneously improved by forming the waveform of the input current to be a waveform of the input AC voltage (i.e., a sine wave).

Figure 6A:
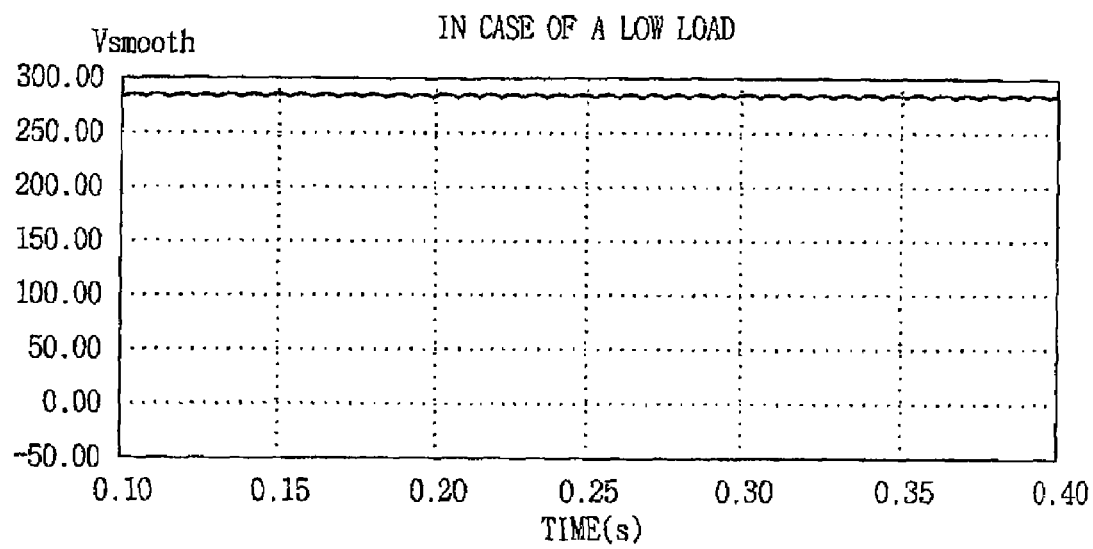
FIGS. 6(a) and 6(b) are views respectively showing a voltage of a smooth capacitor and a current waveform of a reactor for a low load in accordance with an embodiment of the present invention.
Figure 6B:
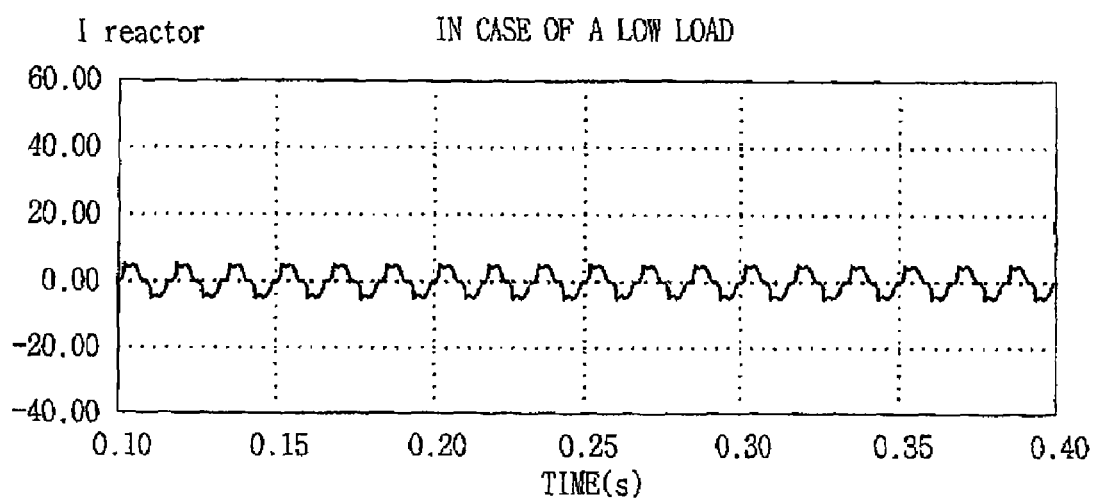
Figure 7A:
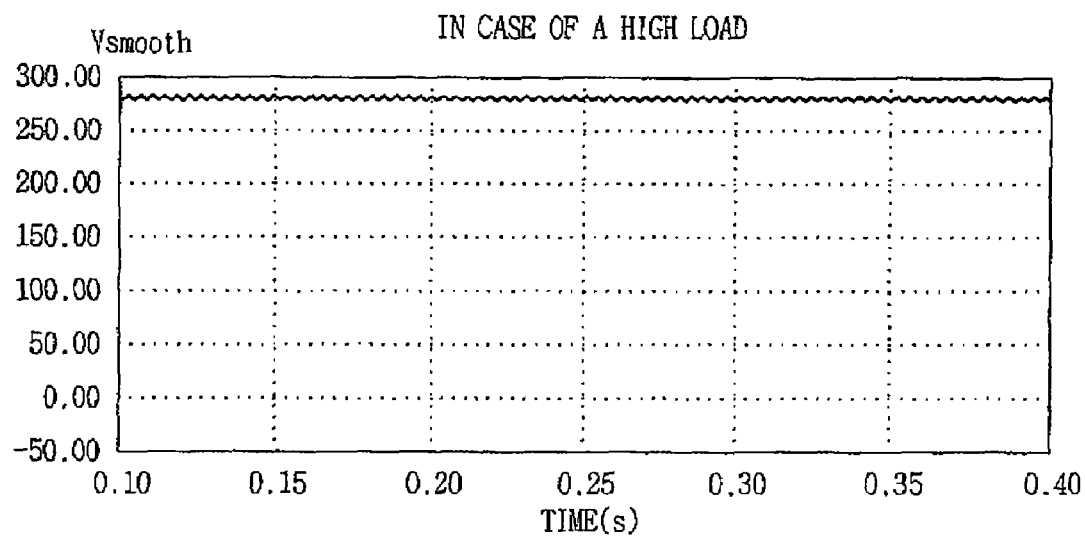
FIGS. 7(a) and 7(b) are views respectively showing a voltage of a smooth capacitor and a current waveform of a reactor for a high load in accordance with an embodiment of the present invention.
Figure 7B:
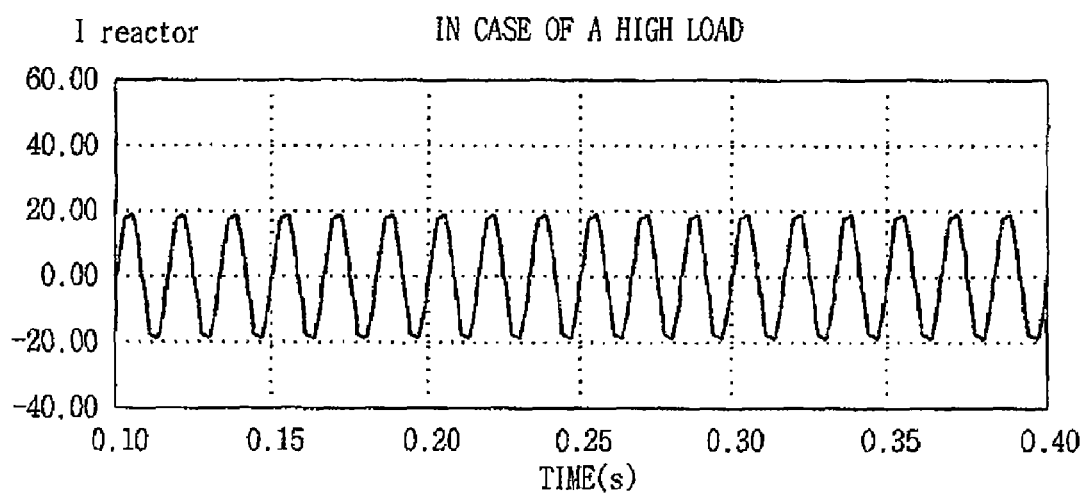

FIGS. 6(a) and 6(b) are views respectively showing waveforms of a smoothed voltage and an input current in case of a low load, and FIGS. 7(a) and 7(b) are views respectively showing waveforms of a smoothed voltage and an input current in case of a high load.

Figure 1:
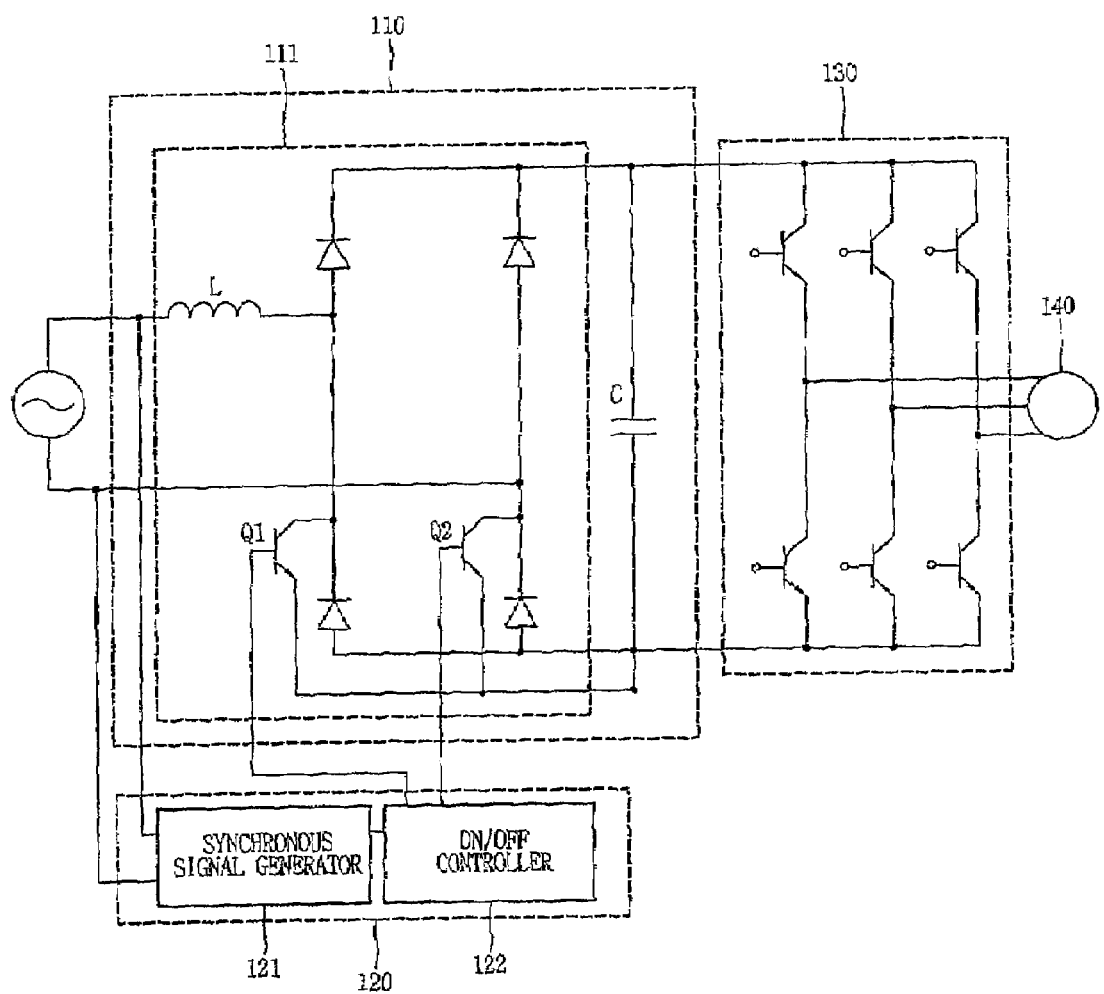
FIG. 1 is a circuit view showing an apparatus for supplying a DC power source according to the related art.
Figure 2A:
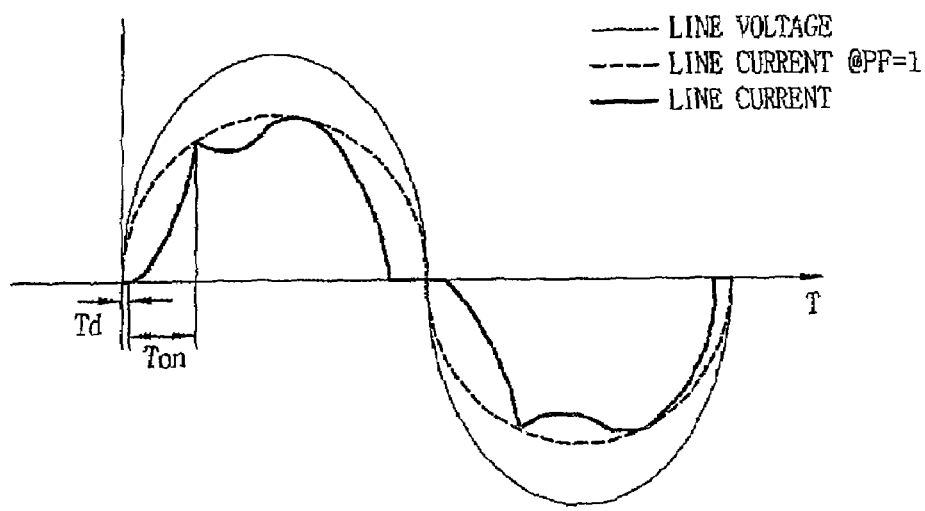
FIGS. 2(a) and 2(b) are views showing a current waveform of the apparatus for supplying the DC power source according to the related art.
Figure 2B:
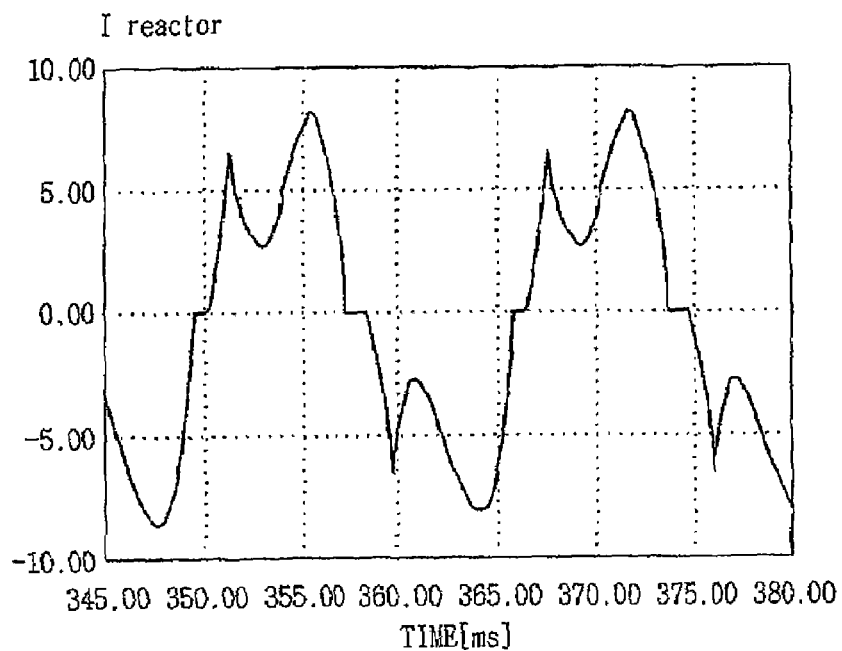

FIGS. 6(b) and 7(b) are views respectively showing current waveforms of a small reactor for a low load and for a high load in accordance with an embodiment of the present invention. It can be noticed, as compared to the waveforms of the input current according to the related art as shown in FIGS. 2(a) and 2(b), that the current waveforms of the small reactor is formed to be more similar to a sine wave which is an ideal waveform.

As described above, in the present invention, the load size can be determined based upon the detected input current amount and the energy charging/discharging operation performed by the power factor compensating unit can be controlled according to the determined load size, to thus supply an optimal energy to drive the load, whereby the power factor compensation standard can be satisfied although the load is changed, and the power factor of the input power source can effectively be compensated by performing the power factor compensation.

In addition, in the present invention, the fluctuation of the input current can be prevented by performing the power factor compensation although using the reactor with the low capacity, which results in an effective reduction of a fabricating cost by virtue of using the reactor with the low capacity.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An apparatus for supplying a direct current power source comprising:
   an input current detecting unit which detects an input current amount to determine a load size;
   a switching control unit which outputs a switching control signal to compensate for a power factor of an input power source based upon the determined load size;
   a filtering/rectifying unit which reduces a harmonic of the input current and rectifies an input alternating current (AC) voltage;
   a power factor compensating unit which is charged by a commercial power source, and supplies energy from the charging to the load based upon the switching control signal;
   a smoothing unit which smoothes the rectified input AC voltage into a DC voltage; and
   an inverter which converts the smoothed DC voltage into an AC voltage and outputs the converted AC voltage to drive the load.

2. The apparatus of claim 1, wherein the input current detecting unit determines the load size by detecting a DC-link current.

3. The apparatus of claim 1, wherein the switching control unit comprises:
   a synchronous signal generator which detects a zero-crossing time point of the input power source and generates a synchronous signal based upon the detected zero-crossing time point; and
   an on/off controller which outputs a switching control signal to compensate for a power factor according to the determined load size.

4. The apparatus of claim 3, wherein the switching control signal is generated by being synchronized with the synchronous signal.

5. The apparatus of claim 3, wherein the on/off controller varies a turn-on time of a switch and a turn-on delay time thereof based upon the load size.

6. The apparatus of claim 3, wherein the on/off controller increases the turn-on time of the switch accordingly as the load size is increased.

7. The apparatus of claim 3, wherein the on/off controller determines a Pulse Width Modulation (PWM) ratio of the switching control signal in proportion to the determined load size.

8. The apparatus of claim 1, wherein the filtering/rectifying unit comprises:
    a small reactor which reduces the harmonic of the input current and prevents an influx of an inrush current; and
    a diode bridge circuit which rectifies the input AC voltage.

9. The apparatus of claim 1, wherein the power factor compensating unit comprises:
    first and second capacitors which are charged by the commercial power source and discharge the energy; and
    first through fourth diodes which form a charging/discharging path of the first and second capacitors.

10. The apparatus of claim 1, wherein the power factor compensating unit compensates for a power factor of the input power source by alternately charging and discharging energy according to the switching control signal.

11. A method for supplying a direct current (DC) power source comprising:
    detecting an input current amount to determine a load size;
    outputting a switching control signal to compensate for a power factor of an input power source based upon the detected load size;
    reducing a harmonic of the input current and rectifying an input AC voltage;
    charging a power factor compensating unit with energy from a commercial power source;
    supplying energy from the charging to the load based upon the switching control signal;
    smoothing the rectified input AC voltage into a DC voltage; and
    converting the smoothed DC voltage into an AC voltage to drive the load.

12. The method of claim 11, wherein determining the load size comprises:
    using a data table indicating a relation between the input current amount and the load size corresponding thereto.

13. The method of claim 11, wherein determining the load size comprises determining the load size by detecting a DC-link current.

14. The method of claim 11, wherein outputting the switching control signal comprises:
    detecting a zero-crossing time point of the input power source and generating a synchronous signal according to the detected zero-crossing time point; and
    outputting the switching control signal for compensating the power source according to the determined load size.

15. The method of claim 14, wherein outputting the switching control signal comprises:
    generating the switching control signal synchronized with the synchronous signal.

16. The method of claim 14, wherein outputting the switching control signal comprises varying a turn-on time of a switch and a turn-on delay time thereof based upon the load size.

17. The method of claim 14, wherein outputting the switching control signal comprises increasing a switching time of the switch accordingly as the load size is increased.

18. The method of claim 14, wherein outputting the switching control signal comprises determining a Pulse Width Modulation (PWM) ratio of the switching control signal in proportion to the determined load size.

19. The method of claim 11, further comprising preventing an influx of an inrush current.

20. The method of claim 11, wherein supplying the energy to the load comprises compensating for a power factor of the input power source by alternately charging and discharging energy based upon the switching control signal.

21. The method of claim 20, wherein supplying the energy from the charging to the load comprises:
    charging a first capacitor and discharging a second capacitor as first and third diodes are turned on and second and fourth diodes are turned off at a starting time point of a plus half period of the input power source when turning on the switch; and
    discharging the first capacitor and charging the second capacitor as the first and third diodes are turned off and the second and fourth diodes are turned on at a starting time point of a minus half period of the input power source when turning on the switch.

* * * * *